United States Patent [19]
Mayhew

[11] Patent Number: 5,103,383
[45] Date of Patent: Apr. 7, 1992

[54] EMERGENCY FLASHER

[76] Inventor: Donald M. Mayhew, 3355 Embry Cir., Atlanta, Ga. 30341

[21] Appl. No.: 572,042

[22] Filed: Aug. 23, 1990

[51] Int. Cl.$^5$ .............................................. F21L 7/00
[52] U.S. Cl. .................................. 362/186; 362/158; 362/183; 362/268; 362/196
[58] Field of Search ................ 362/158, 183, 186, 268, 362/196, 331; 200/60; 116/202

[56] References Cited

U.S. PATENT DOCUMENTS

| | | | |
|---|---|---|---|
| 2,586,374 | 2/1952 | Pennow | 362/268 |
| 2,753,442 | 7/1956 | Wiswell | 362/186 |
| 3,748,457 | 7/1973 | Balitzky et al. | 362/186 |
| 4,177,500 | 12/1979 | Nicholl et al. | 362/183 |
| 4,241,332 | 12/1980 | Farque | 362/186 |
| 4,535,392 | 8/1985 | Montgomery | 362/186 |

Primary Examiner—Ira S. Lazarus
Assistant Examiner—D. M. Cox
Attorney, Agent, or Firm—Hurt, Richardson, Garner, Todd & Cadenhead

[57] ABSTRACT

An all-weather, stable emergency signal lamp comprising a two-piece case, a rechargeable battery, a strobe light assembly and a dome lens.

4 Claims, 3 Drawing Sheets

EMERGENCY FLASHER

BACKGROUND OF THE INVENTION

1. Field of the Invention

The present invention generally relates to a signaling device and more specifically to an emergency flasher, suitable as emergency equipment for roadway vehicles and water craft.

2. Background of the Invention

Many accidents occur on roads and highways, thereby requiring that traffic be directed around an obstacle or hazard. Any method used to redirect vehicular and foot traffic from an area must be clearly visible to pedestrians and drivers, especially at night. Presently lights, reflectors or flares are commonly used to indicate hazardous areas on a roadway at night. These devices suffer from a number of different disadvantages. The lights are usually cumbersome when incorporated with other equipment and, therefore, they are not normally suitable for storage as emergency equipment in automobiles or trucks.

Flares and reflectors mounted on saw horses tend to be lightweight and easily moved and destroyed by moving vehicles. Flares have the disadvantage of having a limited lifetime which may be shorter than the duration of the obstacle or hazard which they are signifying. Additionally, flares may not operate during rain or snow, give off smoke, may injure the person using the flare or damage property surrounding it, and are not reusable. Although a reflector may be an effective means to signal and redirect traffic around an obstacle when the oncoming traffic has light sources such as headlights, traffic traveling without lights may not detect the reflector and thus avoid the obstacle. There is, therefore, a need for an effective, inexpensive, readily portable means of signaling emergency conditions on the road.

SUMMARY OF THE INVENTION

The above-mentioned disadvantages of the prior art are overcome by the emergency flasher of the present invention. Briefly described, the emergency flasher comprises a casing containing the power source, generally a battery, and circuitry of the flasher, and a lens assembly. An upper case and a lower case form the casing, both of which are made of light-weight, durable plastic. The upper and lower cases are joined together by four bolts. The low height of the casing and the specific placement of the battery within the casing give the emergency flasher a low center of gravity which makes it difficult to upset.

The emergency flasher is turned on and off by a switch located on the upper case. When the switch is thrown, power is applied to a flashing source, generally a xenon tube, which flashes. The flashing source is covered by a protective lens, generally colored, in a generally domed configuration. The xenon tube and its protective lens both extend outwardly from the upper surface of the upper case. Once turned on the emergency flasher can flash for an extended period for example, an entire day, at a rate of tens of flashes per minute.

One of the chief advantages of the present invention is that the emergency flasher will produce a brilliant light flash through a 360° horizontal arc for an extended time. Another advantage is that the power source may be recharged and thus reused after it has run down. A power receptacle is provided in the upper case for the purpose of recharging the emergency flasher using an external power source. The low center of gravity is achieved by containing within the lower case the power source for supplying electric current to flash the xenon tube. The emergency flasher is long-lived, of durable construction, impact resistant, easily seen, readily transported and difficult to upset due to its rugged construction and low center of gravity.

Accordingly, it is an object of the present invention to provide an emergency flasher which is reusable, has a long shelf life, and is easy to operate.

Another object of the present invention is to provide an emergency flasher that is not explosive, has a long service life between recharging, and which will operate effectively using a low current, low voltage power source.

It is a still further object of the present invention to provide an emergency flasher which when used does not damage roadways.

It is yet another object of the present invention to provide an emergency flasher which provides a succession of bright flashes radiating in substantially all directions.

It is an object of the present invention to provide an emergency flasher that does not emit fumes, is impact resistant, readily and easily stored in a car, requires very little maintenance, and is easily opened for replacement of the power source.

It is yet another object of the present invention to provide an emergency flasher which is much more luminescent than a flare.

It is an object of the present invention to provide an emergency flasher with a low center of gravity.

It is an object of the present invention to provide an emergency flasher which can be manually turned on and off.

It is a still further object of the present invention to provide an emergency flasher that will remain on even when run over by a vehicle, does not have to sit upright to operate, and has readily replaceable lens covers.

These and other objects, features and advantages will become apparent to one skilled in the art when the following description is read in conjunction with the following figures.

DETAILED DESCRIPTION OF THE INVENTION

Turning now to the drawings in which like numerals denote corresponding parts throughout the various views, a preferred embodiment of the present invention is shown.

Figure 1:
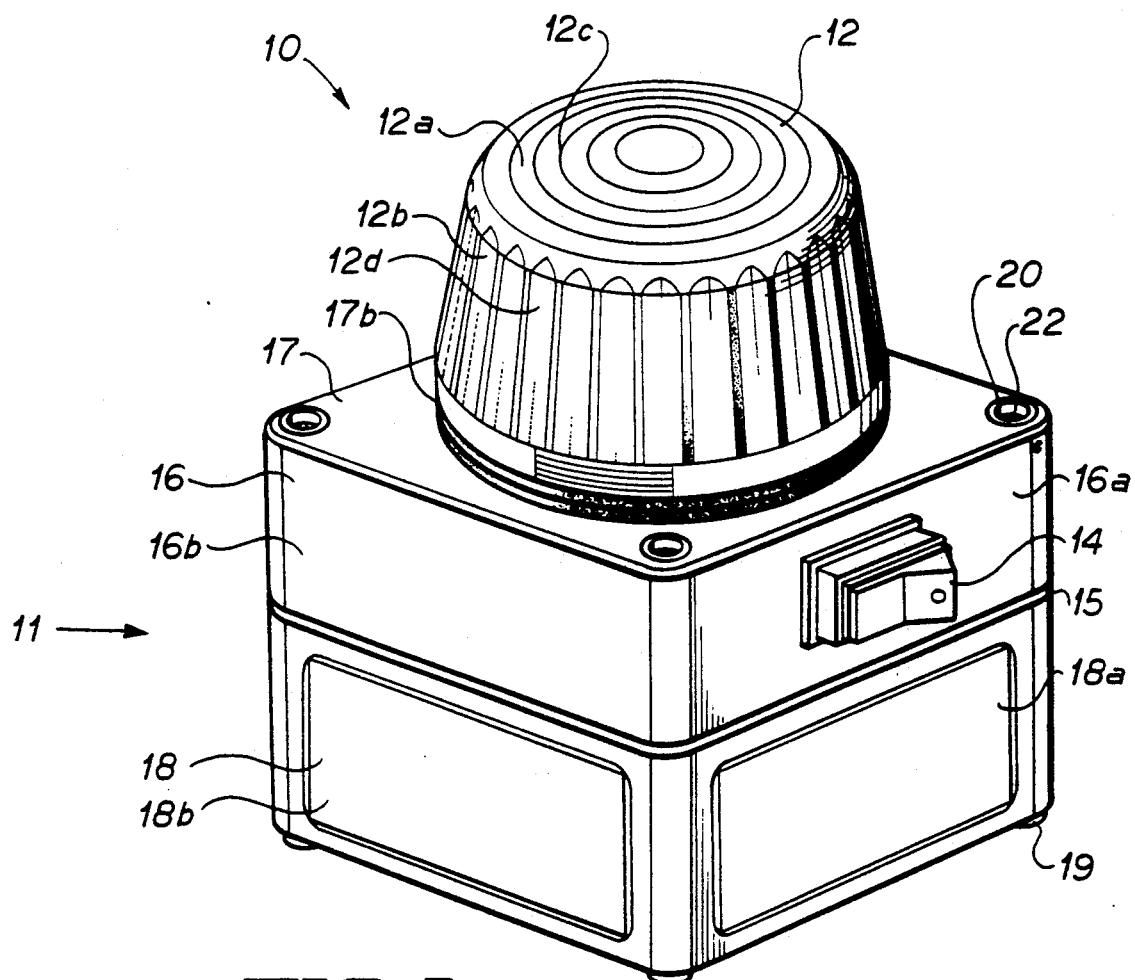
FIG. 1 is a perspective view of an emergency flasher constructed in accordance with the present invention.

As best seen in FIG. 1, the emergency flasher 10 of the present invention includes a generally cubic casing 11, formed by corresponding opposed cup shaped upper 16 and lower 18 cases. Upper case 16 is a hollow, generally inverted cup shaped structure having four generally rectangular sides 16a, 16b, 16c, 16d and a generally square top panel 17. Integrally formed on the top panel 17 is a mounting means 17b. A domed lens 12, generally colored, may be mounted on the emergency flasher via the mounting means 17b. Contained with upper case 16 is the strobe light assembly and circuitry, described in more detail below in connection with FIG. 2.

Lower case 18 also is a hollow, generally cup shaped structure having four generally rectangular sides 18a, 18b, 18c, 18d and a generally square bottom panel (not shown). Feet 19 may be attached to the bottom panel. Lower case 18 houses the electronic circuitry, including the power source 26, of the present invention, which will be discussed in more detail below, also in connection with FIG. 2.

Upper case 16 and lower case 18 have generally square cross-sections. The corners of the square, formed by the joint edges of neighboring sides 16a, 16b, 16c, 16d of the upper case 16 or the neighboring sides 18a, 18b, 18c, 18d of the lower case 18, are rounded having convex actuate edges for safety or aesthetic purposes. Generally, cases 16 and 18 have a height less than their width or length, which assists in providing housing 11 with its low center of gravity. The open rims of upper case 16 formed by sides 16a, 16b, 16c, 16d and lower case 18 formed by sides 18a, 18b, 18c, 18d are joined along together a common edge 15 by plastic bolts 22, which extend through bolts holes 20 in cases 16 and 18 and fit together to form the substantially hollow cubic shaped casing 11. The rim of upper case 16 includes a groove (not shown) which receives an "O" ring (not shown) which abuts and mates with the upper rim of the lower case 18, thereby assuring a tight and close fit of upper case 16 to lower case 18 for protecting the circuitry contained in case 18 from the elements.

Upper and lower cases 16 and 18 are both made of a durable plastic, as are the bolts 22 which join together the upper and lower cases 16 and 18. The cases 16, 18 and the bolts 22 also may be fashioned of any weather treated metal or synthetic material. This construction prevents the casing 11 from deteriorating when exposed to the elements. Bolts 22 have interrupted threads so that less than a full turn will tighten them. In the present embodiment, four bolts 22 are located in corner bolt holes 20.

Mounted on the upper case 16 on side 16a is a switch 14, generally a solid-state single pole, single throw rocker switch. Switch 14 is used to turn the emergency flasher on and off, manually. The portions of the rocker switch 14 exposed to the elements generally are fashioned of plastic or other weather-resistant materials, for immunity to the elements.

On another panel side of the upper case 16, generally the side 16c opposite side 16a, is a power insert plug receptacle 50. Power receptacle 50 allows power source 26 to be recharged. Receptacle 50 is a standard cylindrical shaped female power receptacle, intended to accept a cylindrically shaped male connector plug 56. In general, receptacle 50 and plug 56 are conventional, off-the-shelf items which allow an outside power source to be connected to the power source 26 so as to recharge the power source 26. For example, the outside power source may be a car battery and plug 56 would be attached to a car lighter adapter. Thus, battery 26 may be charged using, for example, a conventional 12 V source. Those skilled in the art will understand that rocker switch 14 and power receptacle 50 may be mounted at any convenient location on casing 11, and may be chosen from any conventional manufacture suitable for use on a device exposed to many different environments.

A central circular opening 21 is formed in top panel 17, having a center concentric with the center of top panel 17. The diameter of central opening 21 is slightly less than the width of top panel 17. Opening 21 allows communication between the interior of casing 11 and either the ambient or the interior of domed lens 12. Protruding through central opening 21 is a lens assembly comprising a protective cover 39 and a lamp member 13, which can be seen in FIGS. 1 and 6 respectively. A lamp base 82 and an adjoining central circular body 84 form lamp member 80. The lamp base 82 resides within upper case 16 and is prevented from exiting through central opening 21 by its outer dimensions, which form a circumferential shoulder having a diameter slightly greater than the diameter of central opening 16b. In contrast, circular body 84 protrudes through and above central opening 21, having a diameter smaller than the diameter of central opening 21. Thus, circular body 84 fits snugly within central opening 21.

External screw threads 86 are provided around the outside diameter of circular body 84. These threads allow lens 12 to be secured onto lamp member 80, lens 12 having complementary screw threads on the interior of the dome. Lens 12 may be constructed of colored materials to provide different colored lights. Additionally, lens 12 provides a pleasing aesthetic effect by obscuring circular body 84 from view.

The xenon tube 38 generally is a curved cylindrical tube of substantially constant diameter terminating in two ends containing electrical terminals 40, 42 respectively. The curve is located in substantially the center of the tube and curves approximately 180° such that the two ends of the tube are substantially parallel to each other and terminate pointing in the same downward direction. Xenon tube 38 generally is a component of a strobe light assembly and extends above central, circular body 84.

Elliptically shaped opening 88 is located substantially in the center of the top, planar surface of central body 84. Opening 88 allows electrical terminals 40, 42 and tube support 38a to communicate with the electrical circuitry located below circular body 84 in the lamp base 82. Generally "T"-shaped upstanding xenon tube support 38a, which consists of a vertical rod adjoined by a horizontal rod ending in two rings, supports the xenon tube 38. Each of the two ends of the xenon tube 38 are inserted into the two rings, respectively. The rings are of such a diameter that they securely hold the xenon tube 38. Terminals 40 and 42 extend parallel to tube support 38a down from the ends of xenon tube 38 into the lamp base.

Figure 2:
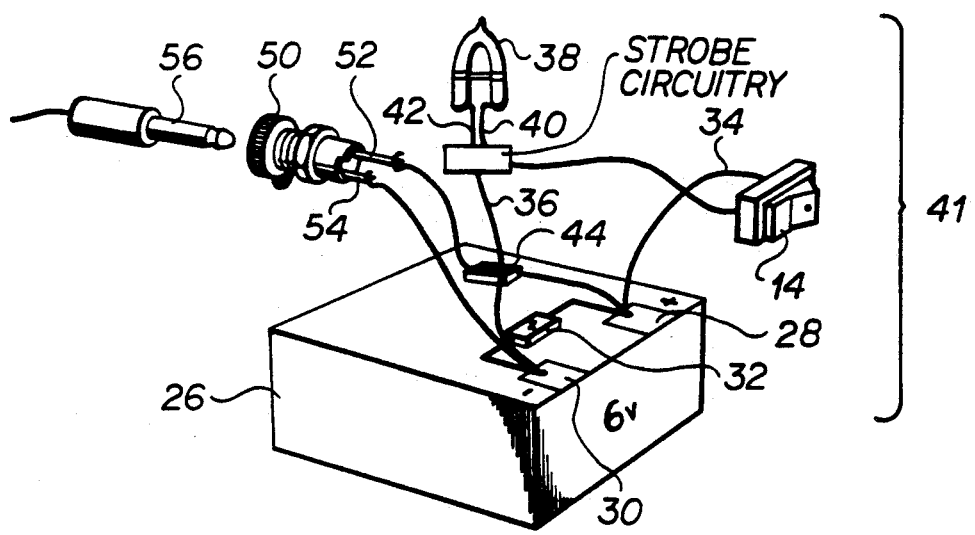
FIG. 2 is a schematic perspective view of the electronic circuitry contained within the casing of the emergency flasher.
Figure 6:
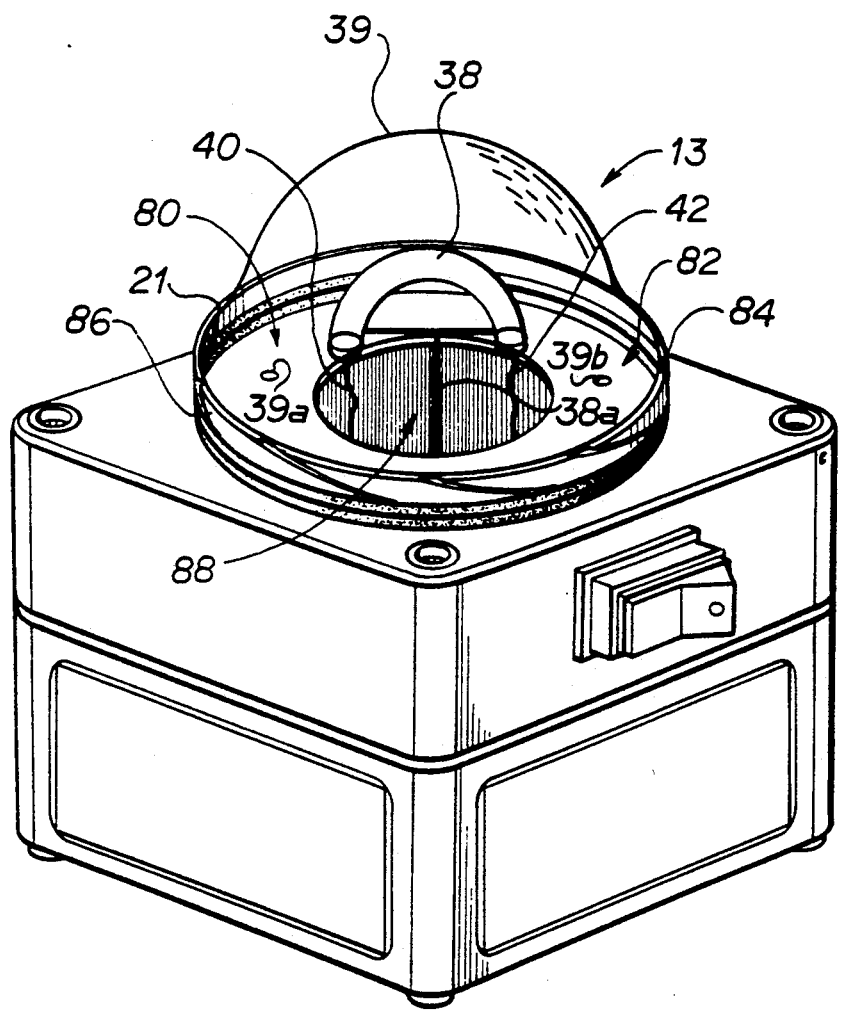
FIG. 6 is a perspective view of the emergency flasher of FIG. 1 with the lens removed.

Referring now to FIGS. 2 and 6, xenon tube 38 is encased in protective cover 39. Protective cover 39 is fashioned from a clear lightweight plastic, although any material and any color that passes light is suitable. Protective cover 39 is dome shaped and secured to the top panel of central circular body 84 by screws 39a and 39b; however, any other mechanical securing means such as nails, staples or glue may be used. Protective cover 39 is constructed to have smaller dimensions than lens 12 such that lens 12 will fit over and surround protective cover 39 as described in more detail below.

Lens 12 encloses both protective cover 39 and lamp assembly 80. Lens 12 mates to the external threads 86 on circular body 84 using internal threads (not shown) formed along the interior of its open, bottom rim. Lens 12 is a cup shaped dome, formed by a circular top wall 12a and an adjoining skirt-like, frusto-conical side wall 12b. The exterior surfaces of lens 12 are smooth, but the interior surfaces comprise ridges to refract the light produced by xenon tube 38. Formed into the interior side of top wall 12a are a series of concentric circular ridges 12c which act as refracting rings, refracting the light from xenon tube 38 as it travels up through lens top 12a. Analogously, a series of protruding vertical ridges 12d having v-shaped cross sections line the interior of side wall 12b. The ridge surfaces 12d refract light emitted by the xenon tube 38 as it passes through side wall 12b.

Lens 12 is fashioned from high impact materials, such as high impact plastic and heat resistant acrylics, thus making it both very sturdy and easily replaceable. In the preferred embodiment lens 12, threaded base and xenon tube 38 are part of strobe light assembly sold as a single unit, such as SECO-LARM SL-126. The SL-126 includes the solid state circuitry 41 necessary to generate the voltages to operate xenon tube 38 from a DC source.

The electronic circuitry associated with emergency flasher 10 can be seen in detail in FIG. 2. As mentioned previously, residing in the bottom of lower case 18 is power supply 26, generally 6 V DC. Power supply 26 has a positive terminal 28 and a negative terminal 30. Together with switch 14, tube 38, and other circuitry allowing for strobe activity, the flasher circuit is fashioned. In the preferred embodiment, a Powersonic PS-40 rechargeable sealed lead-acid battery is used as the power supply 26. Such a battery weighs approximately 1.8 pounds and, if used, is placed on its side on the bottom of lower case 18, thereby providing the low center of gravity which makes emergency flasher very stable. The preferred battery is fully rechargeable in about five hours and provides about 24 hours of continuous power to xenon tube 38. The preferred battery is completely sealed and is therefore weather-proof, maintenance-free, leak proof and usable in any position. Therefore, emergency flasher will continue to operate even when knocked over.

It should be noted that any conventional or unconventional power supply may be used. Less rugged batteries may be used, however, they will not provide the same useful lifetime or service in harsh environments. Non-rechargable batteries also may be used to power the present invention.

Recharging receptacle 50 has two leads 52 and 54. If a rechargeable power supply 26 is used, one lead 52 is connected to the positive terminal of battery 26 through resistor 44. Similarly, receptacle lead 54 connects to the negative terminal 30 of battery 26. Thus, when a power input plug 56 is inserted into receptacle 50, a circuit is completed allowing battery 26 to recharge.

A zener diode 32 is located between the positive terminal 28 and the negative terminal 30 of battery 26 connecting the two. Zener diode 32 protects battery 26 from voltage overloads during recharging. Thus, using zener diode 32 battery 26 may be recharged using a voltage source which may be higher than the battery rating. The maximum voltage level that can be used to recharge the present invention depends upon the voltage rating of the zener diode used. Higher zener voltage ratings allow higher voltage power supplies to be used to recharge battery 26.

The power applied to xenon tube 38 is controlled by switch 14, which connects to the positive-battery terminal 28 via switch lead 34. The opposite switch lead 36 connects to the solid state circuitry 41 in-house in the strobe lamp assembly. Both the positive 40 and negative 42 terminals of xenon tube 38 are electrically connected to solid state circuitry 41, which resides within the base member 82. One input of solid state circuitry 41 connects to negative battery terminal 30. Thus, when rocker switch 14 is closed, current flows to xenon tube 38, causing it to flash.

Figure 3:
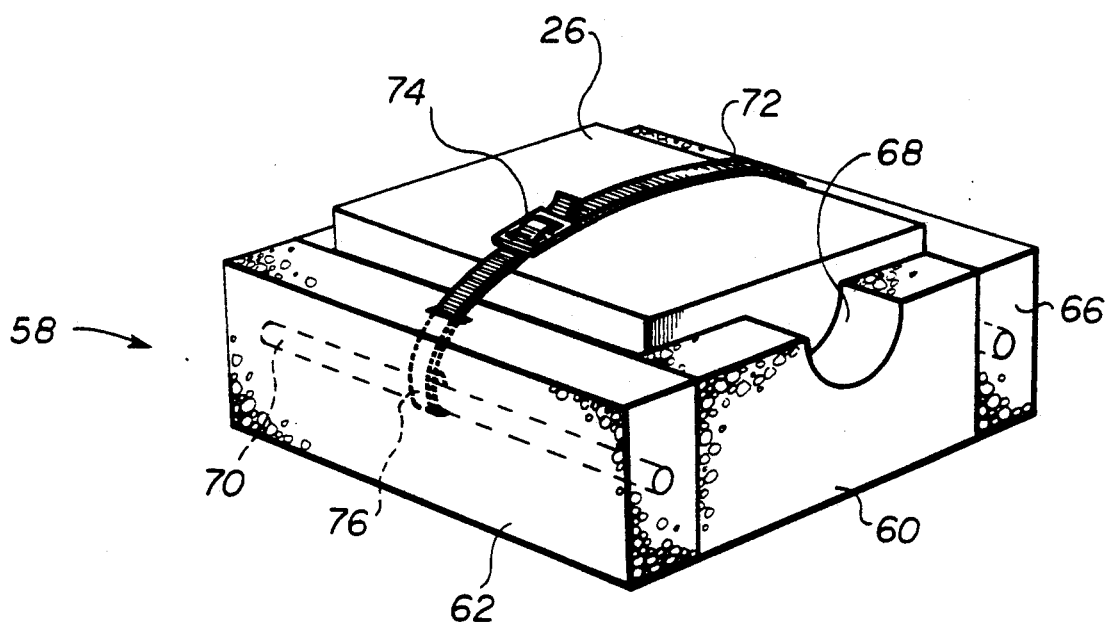
FIG. 3 is a perspective view of the power source which is received in the housing of the flasher of FIG. 1.
Figure 4:
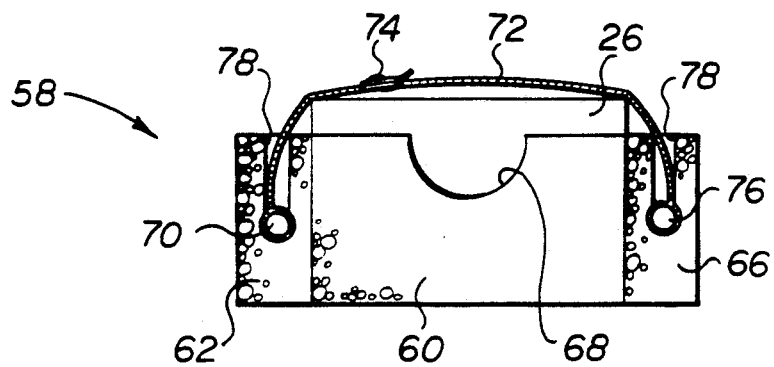
FIG. 4 is a side elevational view, partly in section, of the battery and housing of FIG. 3.
Figure 5:
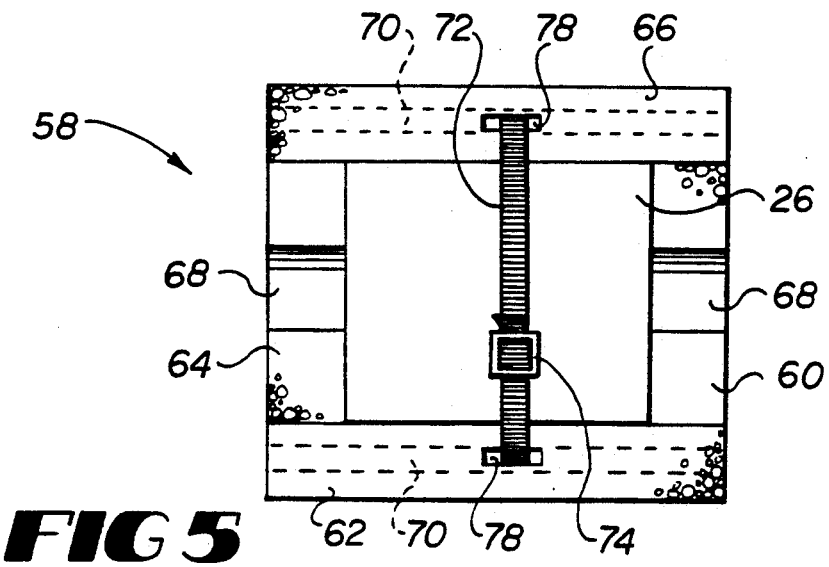
FIG. 5 is a top plan view of the battery and housing of FIG. 3.

Turning now to FIGS. 3, 4 and 5, foamed polystyrene box 58 which surrounds battery 26 and prevents the lateral movement of battery 26 within housing 11 can be seen. Foamed polystyrene box 58 is generally rectangular in shape and consists of four rectangular sides, 60, 62, 64, 66 and a bottom (not shown). Sides 60 and 64 face opposite each other, while sides 62 and 66 are opposite each other. Sides 60, 62, 64, 66 are glued together at right angles and the resultant form is then glued to a bottom piece to form an orthogonal rectangularly shaped box 58 having an open top and a hollow internal area sized such that battery 26 fits snugly within, and an external area sized such that box 58 fits snugly within the interior of lower housing 18. Side 60 and 64 have a semi-circular shaped groove 68 substantially in the middle of their top edges, which allows battery 26 to be more easily removed from foamed polystyrene box 58.

Substantially in their middle, sides 62 and 66 contain an embedded cylindrical rod 70. Each rod 70 extends substantially the length of each side 62 and 66. Rods 70 secure ends 76 of strap 72, each of which are each wrapped around a rod 70, respectively. Strap 72 extends up through rectangular side channels 78 located in sides 62 and 66. Strap 72 is securely fastened across the top of battery 26 using sliding buckle 74, thereby releaseably securing battery 26 and preventing its upward movement. Strap 72 is generally rectangular in shape and made of any durable yet flexible material.

It would be obvious to those skilled in the art that many variations may be made in the embodiment chosen for the purpose of illustration the best mode of making and operating the present invention, without departing form the scope there of as defined by the appended claims.

I claim:

1. An emergency signal lamp assembly which emits a light signal for indicating the location of an object in the vicinity of the lamp assembly comprising:

(a) a lower cup-like case member having a planar rectangular bottom panel having a plurality of edges and a plurality of upstanding first side walls extending perpendicularly to said bottom panel from the edges of said bottom panel, said first side walls having first side edges which are joined to the adjacent first side edges of adjacent first side walls defining an upstanding hollow generally rectangular tubular portion, and upper edges which are in a common plane parallel to the plane of said bottom panel, said upper edges defining a continuous first rim of said lower case member, said first rim defining an open end of said lower case member;

(b) an upper cup-like inverted case member having a generally planar rectangular top panel having a plurality of second edges and a plurality of downwardly projecting second side walls extending perpendicularly to said top panel from the edges of said top panel, said second side walls having second side edges which are joined to the adjacent second side edges of adjacent second side walls defining a downwardly projecting hollow generally rectangular tubular portion, and which are in a common plane parallel to the plane of said top panel, said lower edges defining a continuous second rim of said upper case member, said second rim defining an open end of said upper case member, said top panel being provided with a central circular opening of a diameter slightly less than the width of said top panel, said first rim and said second rim having substantially the same dimensions and acting in concert when juxtaposed forming a sealed joint such that said lower member and said upper member form an enclosed, hollow case;

(c) securing means for releasably securing said upper case member and lower case member together;

(d) a lamp member received in said circular opening, said lamp member having a base portion being located within said upper case member, said base portion arresting outward movement of said lamp member through said central opening and a central circular body having an outer diameter which is received in said central circular opening, said central circular body having external screw threads being located peripherally on the outer diameter and a generally flat portion also peripherally on the outer diameter located between said screw threads and said base portion;

(e) a strobe lamp supported in the central circular body, said strobe lamp comprising a tube and electrical circuitry;

(f) a protective dome for covering said strobe lamp and said circular body member, said dome being sufficiently transparent to permit light from said strobe lamp to be transmitted readily in all directions;

(g) a lens comprising a top wall and an upwardly tapering frusto-conical side wall, said side wall having an open bottom rim portion provided with internal screw threads for engaging said external screw threads of said central circular body, an inner surface of said side wall of said lens being provided with surfaces for refracting light from said strobe lamp as it passes through said side wall, and said top wall integrally formed with and closing the upper end of said side wall of said lens;

(h) flasher means in said circuit for cyclically passing electricity to said strobe lamp to cause said strobe lamp to flash intermittently;

(i) a power source comprising a battery for powering said circuit;

(j) insulating material at least partially surrounding said battery for arresting appreciable lateral movement of said battery within said lower case member; and (k) switch means for the electrical communication between said battery and said flasher means.

2. The emergency signal lamp of claim 1 further comprising a means for recharging said battery, said recharging means comprising a receptacle electrically connected to said battery and mounted on one of said case members.

3. The emergency signal lamp of claim 1 further comprising means for releaseably securing said battery within said lower case member.

4. The emergency signal lamp of claim 1 wherein said top wall of said dome includes concentric refracting rings for refracting the light passing upwardly from said lamp through said top wall.

* * * * *